US008953763B2

(12) United States Patent
Croak et al.

(10) Patent No.: US 8,953,763 B2
(45) Date of Patent: Feb. 10, 2015

(54) METHOD AND APPARATUS FOR PROVIDING AN AUDIBLE CALLING PARTY IDENTIFICATION FOR A CALL WAITING SERVICE

(71) Applicant: AT&T Corp., New York, NY (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 174 days.

(21) Appl. No.: 13/769,739

(22) Filed: Feb. 18, 2013

(65) Prior Publication Data

US 2013/0155910 A1 Jun. 20, 2013

Related U.S. Application Data

(63) Continuation of application No. 12/633,764, filed on Dec. 8, 2009, now Pat. No. 8,379,817, which is a continuation of application No. 11/025,204, filed on Dec. 29, 2004, now Pat. No. 7,639,790.

(51) Int. Cl.
| | |
|---|---|
| *H04M 15/06* | (2006.01) |
| *H04L 29/06* | (2006.01) |
| *H04M 3/428* | (2006.01) |
| *H04M 7/00* | (2006.01) |
| *H04M 3/436* | (2006.01) |

(52) U.S. Cl.
CPC .............. *H04L 65/40* (2013.01); *H04M 3/4288* (2013.01); *H04M 7/0003* (2013.01); *H04M 3/436* (2013.01)
USPC .................................. 379/142.08; 379/215.01

(58) Field of Classification Search
USPC ........................................ 379/142.08, 215.01
See application file for complete search history.

(56) References Cited

U.S. PATENT DOCUMENTS

| | | | |
|---|---|---|---|
| 4,899,358 | A  | 2/1990 | Blakley |
| 6,219,414 | B1 | 4/2001 | Maciejewski et al. |
| 6,339,639 | B1 | 1/2002 | Henderson |
| 6,735,295 | B1 | 5/2004 | Brennan et al. |
| 6,954,521 | B2 | 10/2005 | Bull et al. |
| 7,224,792 | B2 | 5/2007 | Fusco |
| 7,639,790 | B2 | 12/2009 | Croak et al. |
| 8,379,817 | B2 | 2/2013 | Croak et al. |
| 2003/0035526 | A1 | 2/2003 | Bull et al. |
| 2003/0053602 | A1 | 3/2003 | Stuckman et al. |
| 2003/0068020 | A1 | 4/2003 | Hamrick et al. |
| 2003/0108172 | A1 | 6/2003 | Petty et al. |
| 2004/0090954 | A1 | 5/2004 | Zhang et al. |

FOREIGN PATENT DOCUMENTS

| | | |
|---|---|---|
| GB | 2284723 A  | 6/1995 |
| JP | 2000-184065 | 6/2000 |
| JP | 2001-268248 | 9/2001 |

OTHER PUBLICATIONS

European Search Report, Apr. 21, 2006.
Notice of Preliminary Rejection for Korean Patent Application No. 2005-0133331 with [redacted] the Brief Summary of the Notice of Preliminary Reject as presented by Korean Agent, Apr. 26, 2012, 8 total pages.
Examination Report for EP 05112653.0, Jun. 29, 2010, consists of 4 pages.

*Primary Examiner* — Creighton Smith

(57) ABSTRACT

The present invention enables users of packet-switched network services, e.g., VoIP network services, to hear a very gentle whispering tone that quietly conveys the identity of the calling party when they are engaged in conversation and to receive a call-waiting signal. The tone is audible only to the called party but does not mute the ongoing conversation path. This enables subscribed users to hear their ongoing conversation while receiving the whispering tone.

20 Claims, 4 Drawing Sheets

METHOD AND APPARATUS FOR PROVIDING AN AUDIBLE CALLING PARTY IDENTIFICATION FOR A CALL WAITING SERVICE

This application is a continuation of U.S. patent application Ser. No. 12/633,764, filed Dec. 8, 2009, (currently allowed) which is a continuation of U.S. patent application Ser. No. 11/025,204, filed Dec. 29, 2004, now U.S. Pat. No. 7,639,790. The aforementioned related patent applications are herein incorporated by reference.

The present invention relates generally to communication networks and, more particularly, to a method and apparatus for enabling audible calling party identification for call waiting services in packet-switched networks, e.g., Voice over Internet Protocol (VoIP) networks.

BACKGROUND OF THE INVENTION

Users of telephony services frequently subscribe to call waiting services. The displays for the calling party identification data transmitted in signaling message associated with call waiting services are either on a base station or in the handset that the users are holding to their ear. These situations forces users to either have to remove the handset from their ears or stay close to the base station in order to see who is calling when they are engaged in a conversation.

Therefore, a need exists for a method and apparatus for enabling audible calling party identification for call waiting services in packet-switched networks, e.g., Voice over Internet Protocol (VoIP) networks.

SUMMARY OF THE INVENTION

In one embodiment, the present invention enables users of packet-switched networks services, e.g., VoIP network services, to receive a call-waiting signal. Specifically, the present invention enables users to hear a very gentle whispering tone that quietly conveys the identity of the calling party when they are engaged in conversation. The tone is audible only to the called party but does not mute the ongoing conversation path. This enables subscribed users to hear their ongoing conversation while receiving the whispering tone.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
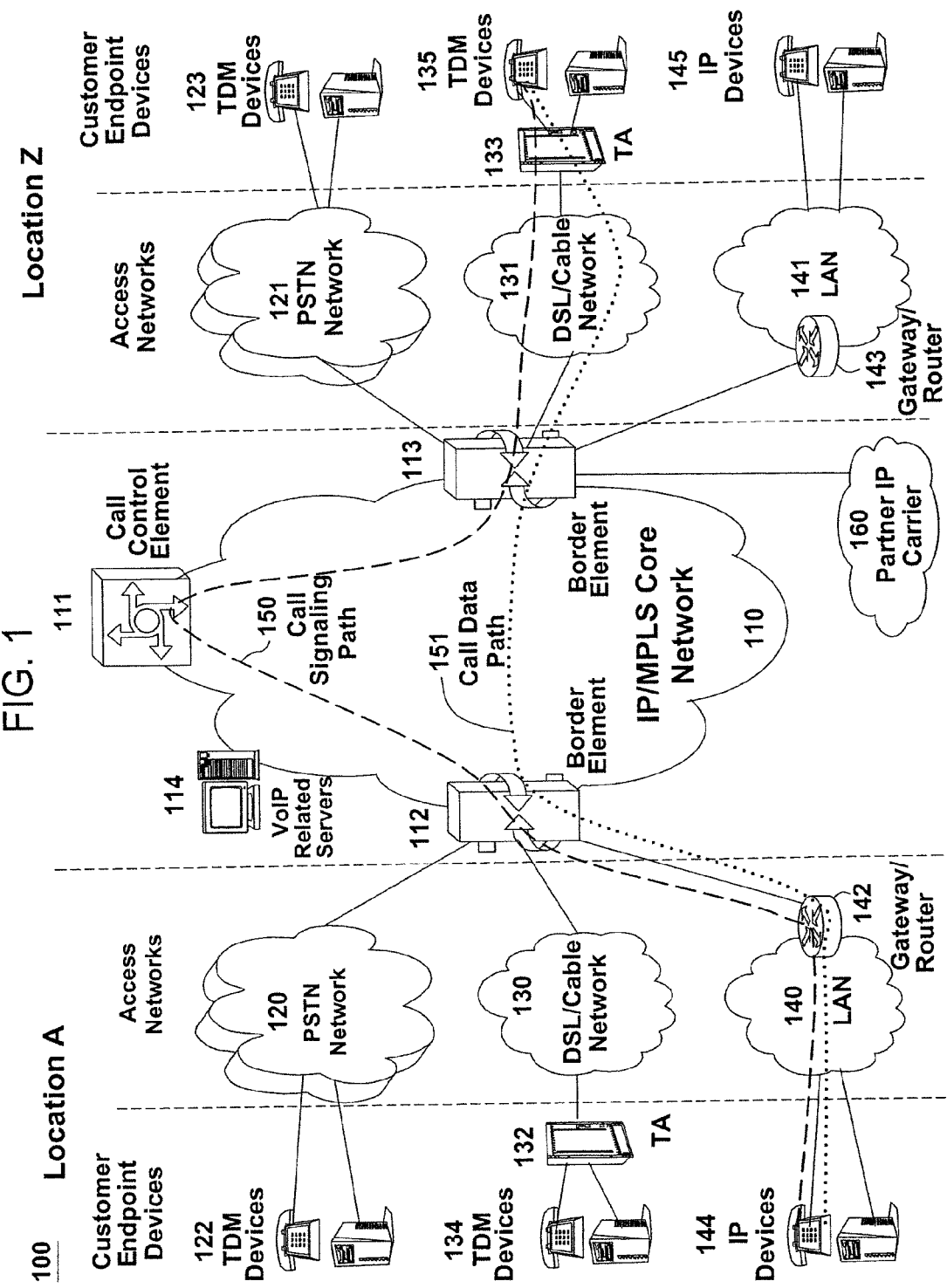
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Many users of telephony services frequently subscribe to call waiting services. The displays for the calling party identification data transmitted in signaling message associated with call waiting services are either on a base station or in the handset that the users are holding to their ear. These forces users to either have to remove the handset from their ears or stay close to the base station in order to see who is calling when they are engaged in a conversation.

To address this criticality, the present invention enables users of VoIP network services to hear a very gentle whispering tone that quietly conveys the identity of the calling party when they are engaged in conversation and receive a call-waiting signal. The tone is audible only to the called party but does not mute the ongoing conversation path. This enables subscribed users to hear their ongoing conversation while receiving the whispering tone.

Figure 2:
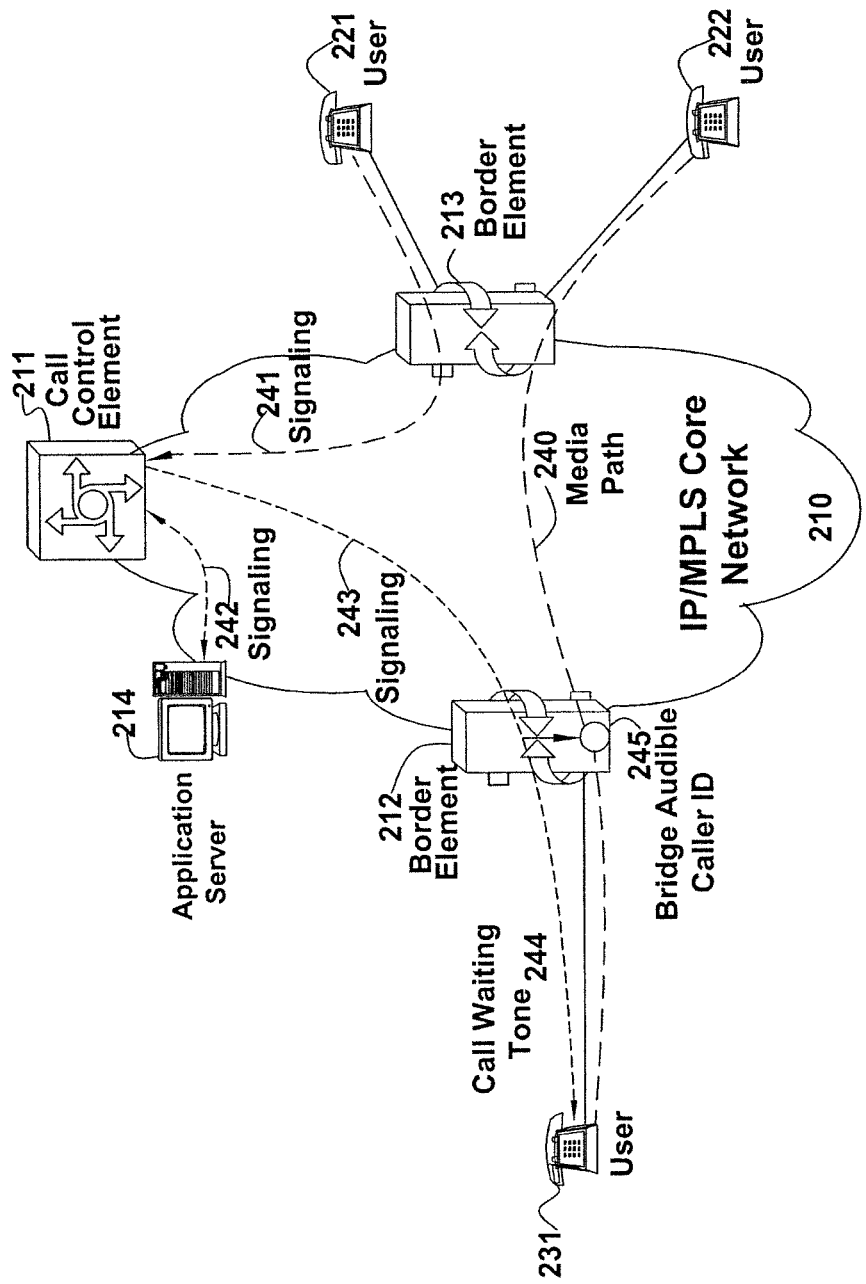
FIG. 2 illustrates an example of enabling audible calling party identification for call waiting services in a VoIP network of the present invention.

FIG. 2 illustrates an example of providing an audible calling party identification for call waiting services in a packet-switched network, e.g., a VoIP network. In FIG. 2, user 222 and user 231 are engaged in a conversation using media path 240 while user 221 makes a call to user 231. CCE 211 receives a call setup message 241 via BE 213 from the endpoint device used by user 221. CCE 211 communicates with Application Server (AS) 214, flow 242, to find out that user 231, the called party, has subscribed to the call waiting service feature. In addition, CCE 211 also finds out that user 231 has subscribed to the audible calling party identification service feature. CCE 211 then sends a call setup message 243 to the called party endpoint through BE 212. The call setup message indicates to BE 212 that BE 212 needs to send a normal call waiting tone, such as a beep, to the called party endpoint using flow 244. In addition, BE 212 also bridges the existing media path 240 with an audible whispering tone, action 245, conveying the identity of the calling party identification. Then the called party, user 231, can decide whether to put user 222 on hold to answer the call from user 221. The subsequent call setup procedures will proceed the same way as a normal phone call.

Figure 3:
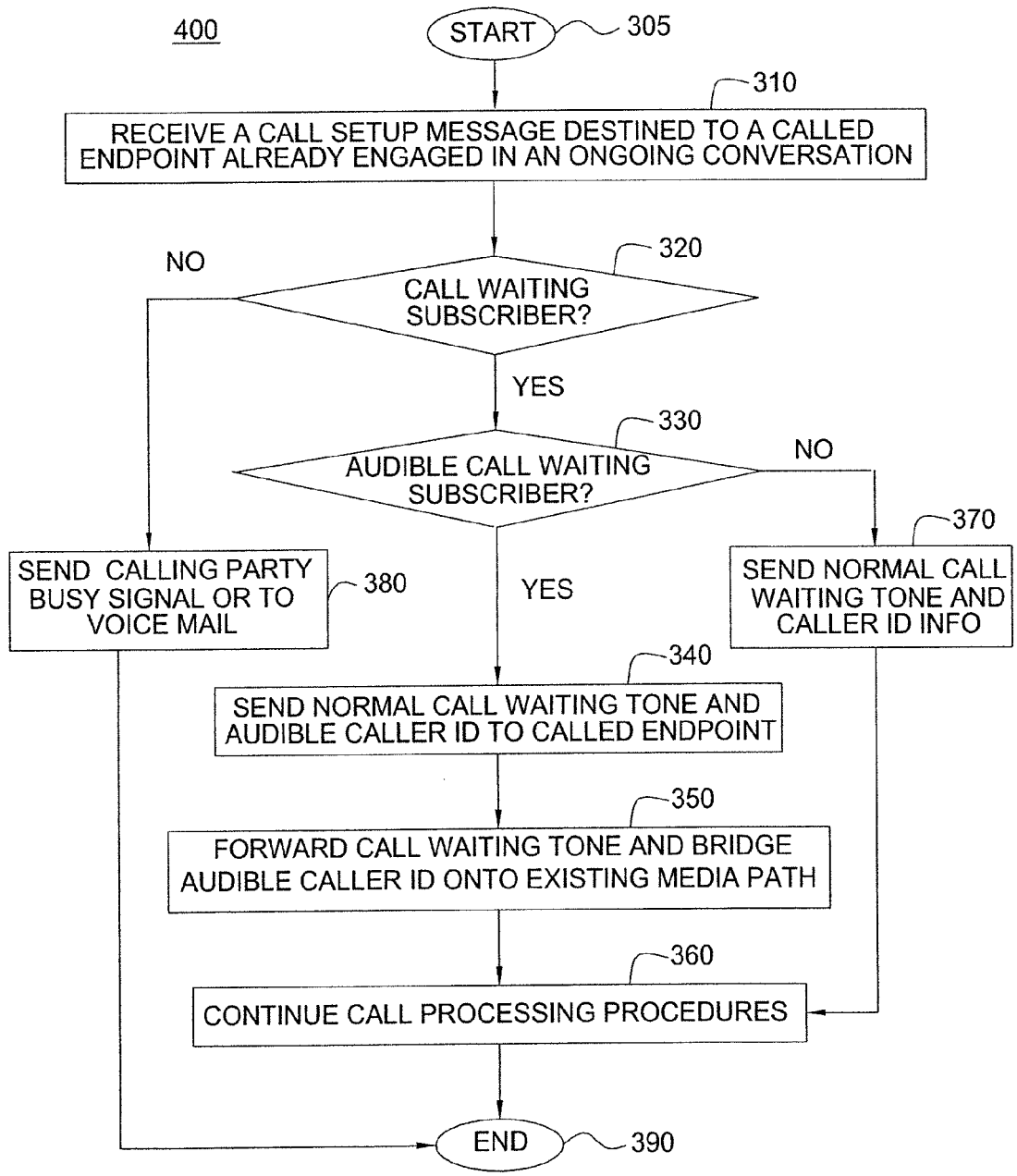
FIG. 3 illustrates a flowchart of a method for enabling audible calling party identification for call waiting services in a VoIP network of the present invention.

FIG. 3 illustrates a flowchart of a method for enabling audible calling party identification for call waiting services in a packet-switched network, e.g., a VoIP network. Method 300 starts in step 305 and proceeds to step 310.

In step 310, the method receives a call setup message destined to a called endpoint already engaged in an ongoing conversation. In step 320, the method checks if the called endpoint has subscribed to the call waiting service feature. If the called endpoint has subscribed to the call waiting service feature, the method proceeds to step 330; otherwise, the method proceeds to step 380. In step 330, the method checks if the called endpoint has subscribed to the audible calling party identification service feature. If the called endpoint has subscribed to the audible calling party identification service feature, the method proceeds to step 340; otherwise, the method proceeds to step 370. In step 340, the method sends a signaling message conveying a normal call waiting tone and an audible calling party identification toward the called party endpoint. In one embodiment, the network may employ a text to speech application and/or system to generate the audible calling party identification. In step 350, the BE that is associated with the called party endpoint will forward the normal call waiting tone to the called party endpoint and bridges the audible calling party identification onto the existing media path in the direction towards the called party endpoint. The audible calling party identification is conveyed via a whispering tone or a low volume tone and will not disrupt on-going conversation on the existing media path. The audible calling party identification includes the calling party phone number and/or the calling party name, if available. The audible calling party identification can only be heard by the called party. In step 360, the method continues the call setup procedures as in the case of a normal phone call. In step 370, the method sends a normal call waiting tone and calling party identification to the called party endpoint. In step 380, the method sends the calling party a busy signal or to the voice mail box of the called party. The method ends in step 390.

Figure 4:
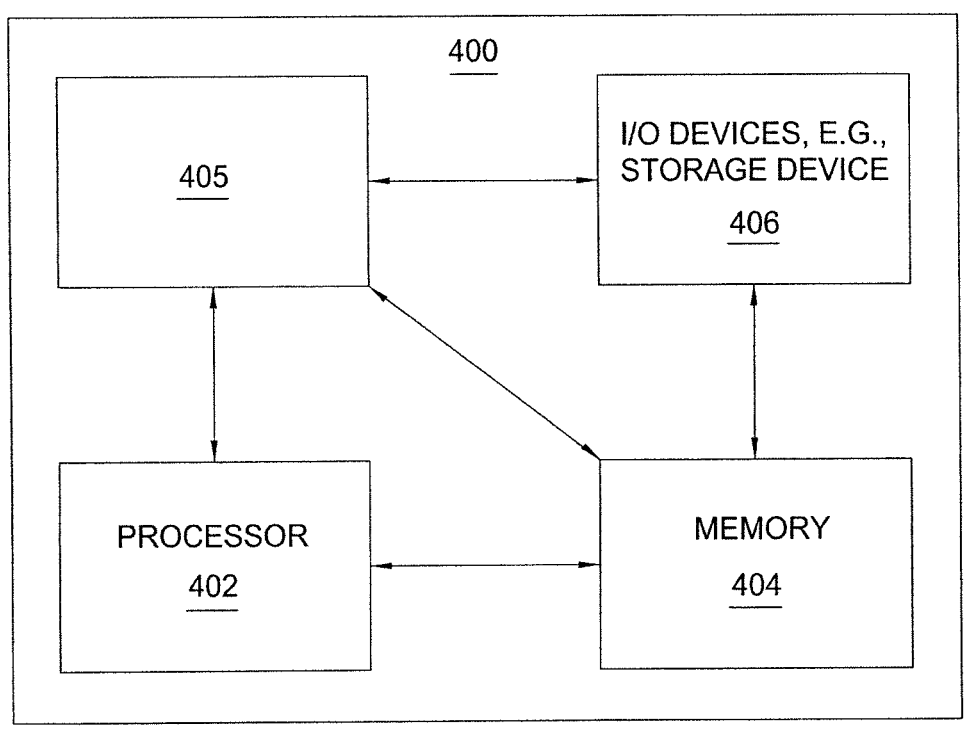
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an audible calling party identification module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present audible calling party identification module or process 405 can be loaded into memory 404 and executed by processor 402 to implement the functions as discussed above. As such, the present audible calling party identification process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a call waiting service in a communication network, comprising:
    receiving, by a processor, a call setup message destined to an endpoint of a called party, where the endpoint of the called party is engaged in an on-going call;
    determining, by the processor, whether the called party is registered to receive an audible calling party identification; and
    sending, by the processor, a message to cause a sending of the audible calling party identification to the endpoint of the called party if the called party is registered to receive the audible calling party identification, wherein the sending of the audible calling party identification comprises bridging the audible calling party identification at a lower volume level onto an existing media path of the ongoing call.

2. The method of claim 1, wherein the communication network is a packet network.

3. The method of claim 2, wherein the packet network comprises a voice over internet protocol network.

4. The method of claim 1, wherein the call setup message is received by the processor of a call control element.

5. The method of claim 1, wherein the audible calling party identification is bridged by a border element associated with the endpoint of the called party.

6. The method of claim 1, wherein the audible calling party identification comprises a phone number of the calling party.

7. The method of claim 1, wherein the audible calling party identification comprises a name identification of the calling party.

8. A tangible computer-readable medium storing a plurality of instructions which, when executed by a processor, cause the processor to perform operations for providing a call waiting service in a communication network, the operations comprising:
    receiving a call setup message destined to an endpoint of a called party, where the endpoint of the called party is engaged in an on-going call;
    determining whether the called party is registered to receive an audible calling party identification; and
    sending a message to cause a sending of the audible calling party identification to the endpoint of the called party if the called party is registered to receive the audible calling party identification, wherein the sending of the audible calling party identification comprises bridging the audible calling party identification at a lower volume level onto an existing media path of the ongoing call.

9. The tangible computer-readable medium of claim 8, wherein the audible calling party identification comprises a name identification of the calling party.

10. The tangible computer-readable medium of claim 9, wherein the communication network is a packet network.

11. The tangible computer-readable medium of claim 10, wherein the packet network comprises a voice over Internet protocol network.

12. The tangible computer-readable medium of claim 8, wherein the call setup message is received by the processor of a call control element.

13. The tangible computer-readable medium of claim 8, wherein the audible calling party identification is bridged by a border element associated with the endpoint of the called party.

14. The tangible computer-readable medium of claim 8, wherein the audible calling party identification comprises a phone number of the calling party.

15. A system for providing a call waiting service in a communication network, comprising:
    a processor; and
    a computer-readable medium storing a plurality of instructions which, when executed by the processor, cause the processor to perform operations, the operations comprising:
        receiving a call setup message destined to an endpoint of a called party, where the endpoint of the called party is engaged in an on-going call;
        determining whether the called party is registered to receive an audible calling party identification; and
        sending a message to cause a sending of the audible calling party identification to the endpoint of the called party if the called party is registered to receive the audible calling party identification, wherein the sending of the audible calling party identification comprises bridging the audible calling party identification at a lower volume level onto an existing media path of the ongoing call.

16. The system of claim 15, wherein the communication network is a voice over internet protocol network.

17. The system of claim 15, wherein the call setup message is received by the processor of a call control element.

18. The system of claim 15, wherein the audible calling party identification is bridged by a border element associated with the endpoint of the called party.

19. The system of claim 15, wherein the audible calling party identification comprises a phone number of the calling party.

20. The system of claim 15, wherein the audible calling party identification comprises a name identification of the calling party.

* * * * *